INVENTOR.
GAYLORD W. BROWN

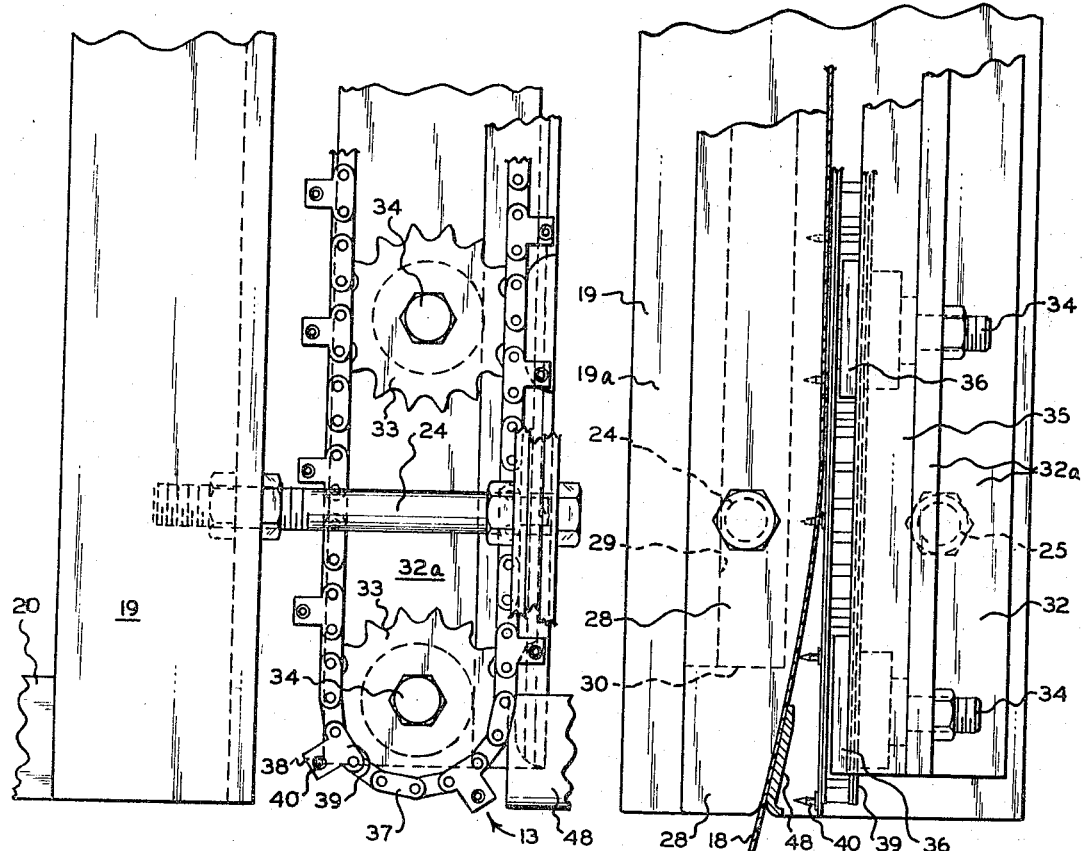
FIG. 4
FIG. 5
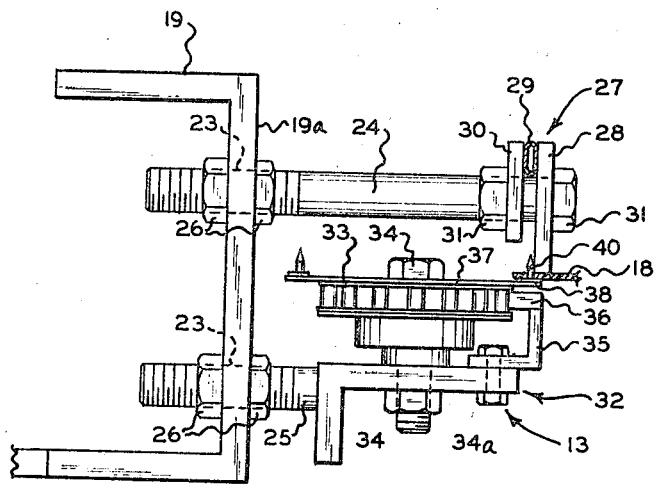
FIG. 3
INVENTOR.
GAYLORD W. BROWN
BY
ATTORNEYS

United States Patent Office 3,321,561
Patented May 23, 1967

3,321,561
METHODS FOR TREATING ORGANIC PLASTIC SHEET TO BE DIFFERENTIAL PRESSURE FORMED
Gaylord W. Brown, Beaverton, Mich., assignor to Brown Machine Company of Michigan, Inc., a corporation of Michigan
Filed July 24, 1964, Ser. No. 384,895
2 Claims. (Cl. 264—88)

This invention relates to methods for preparing a thermoplastic sheet for differential pressure forming while transporting it through a forming machine to the forming station, and more particularly to plastic sheet conveying and heating apparatus for differential pressure forming machines for conveying a continuous, thermoplastic, organic plastic sheet from a roll or from a sheet extruding machine to and through a heating zone where the sheet is treated preparatory to its entering a molding or forming zone where parts are formed from the sheet. The invention is particularly concerned with a method of preventing the sheet from sagging because of the widthwise thermal expansion which occurs in the sheet as it passes through the heating zone. Sagging has not been a problem in forming sheets of polystyrene which may be biaxially stretched while passing through the heating zone in the manner indicated in United States Patent No. 3,121,916. However, polyolefin plastics such as linear polyethylene cannot be stretched in this manner prior to the forming operation because stretching causes a differential shrinkage to occur in the formed parts when the parts cool, which warps the parts.

In the process of molding articles from polyolefin plastic sheet stock, the stock is normally incrementally advanced by parallel conveyors which grip the sheet at its opposite sides and convey it toward a molding zone where dies form articles from the sheet. Prior to being introduced to the molding zone, the sheet is passed through a heating zone to bring it to a proper temperature for forming. As the sheet is brought to the desired forming temperature, it will gradually expand, and this expansion, or elongation, in a widthwise direction will cause the unsupported mid-portion of the sheet to gradually sag as it passes through the heating zone. This sagging of the sheet causes undue and non-uniform stretching to occur in the sheet because of the unevenly distributed weight of the sagged portion and the result is that defective parts are formed with varying wall thicknesses and/or wrinkles and these parts are undesirable and represent wasted production. Further, because the stretch occurs principally in localized areas of the sheet, parts formed from these areas will be of reduced wall thickness relative to parts formed from other portions of the sheet, and the design of machinery for further processing all the parts formed is accordingly complicated.

An object of this invention is to provide sheet conveying method of the character described with means for preventing the sagging of the sheet stock which would otherwise occur with heating of the material to a forming temperature as it is conveyed through the heating zone.

A further object of the invention is to provide sheet conveying method with sag prevention means of this type which can be easily incorporated in present molding machinery, and which is simple and inexpensive to construct.

Other objects and advantages of the invention will be pointed out specifically or will become apparent from the following description when it is considered in connection with the appended claims and the accompanying drawings, in which:

FIGURE 3 is an enlarged, front end elevational view of one of the sheet conveying elements;

FIGURE 4 is a fragmentary, top plan view thereof;

FIGURE 5 is a fragmentary, side elevational view thereof; and

Figure 1:
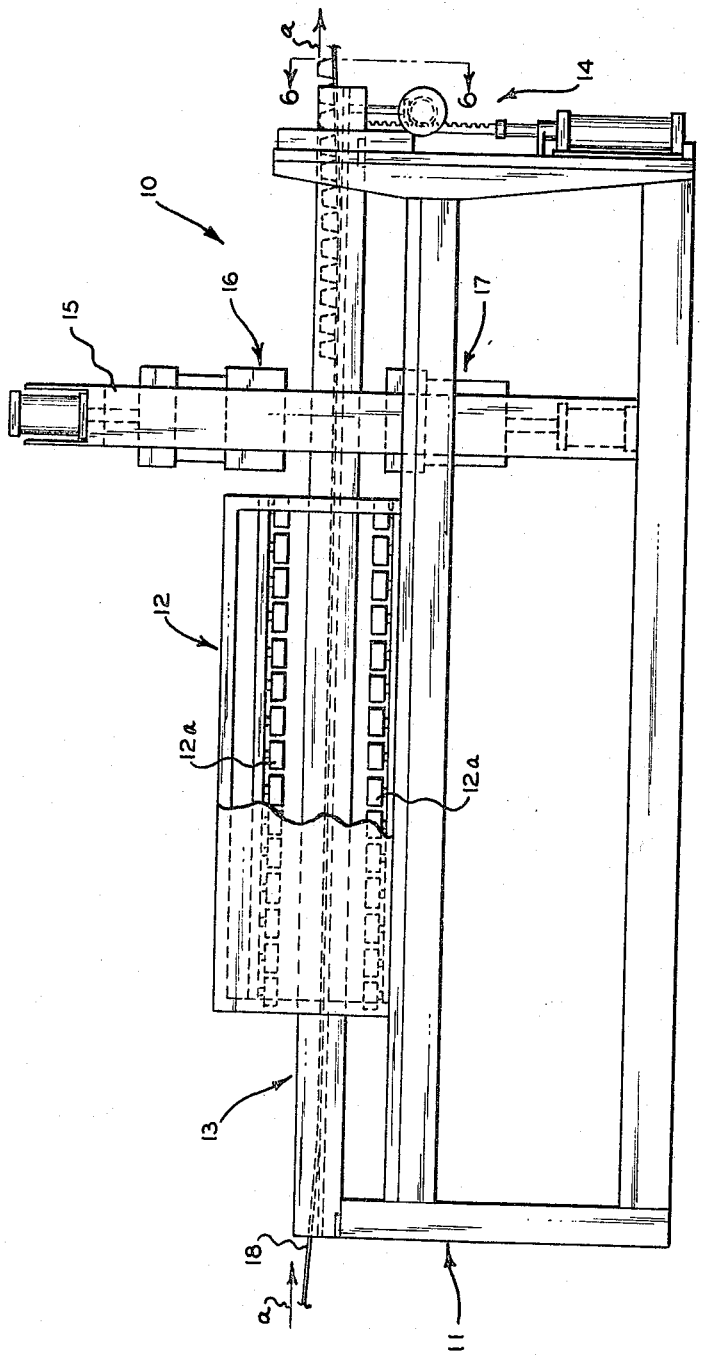
FIGURE 1 is a side elevational view of a differential pressure forming machine incorporating the invention.

Referring now more particularly to the accompanying drawings in which only a preferred embodiment of the invention is shown, a numeral 10 generally indicates the differential pressure forming machine, which includes a frame 11 supporting a bank of upper and lower heating units generally designated 12, sheet conveying mechanism generally designated 13, conveyor advancing drive mechanism generally designated 14, and a forming station F defined by vertical columns 15 on which vertically reciprocating upper and lower forming die platens 16 and 17 are moved toward and away from one another in the forming operation. The differential pressure forming machine, with the exception of the invention disclosed in the present application, is completely described in applicant's assignee's copending United States patent applications Ser. Nos. 293,959 and 276,000. The thermoplastic sheet stock 18 is moved by the conveying mechanism 13 between the banks of heating lamp 12a mounted by the heating units 12 to the forming station F in the direction indicated by the arrows "a" in FIGURE 1.

As shown in FIGURES 2–5, the sheet conveying mechanism 13 includes a pair of spaced apart, main support channels or rails 19 having laterally extending brackets 20 which adjustably mount the rails 19 on the frame 11 by means of bolts 21. Each bracket 20 has an elongated slot 22 which permits adjustment of the rails 19 for various widths of sheet stock. A plurality of openings 23 (FIGURE 3) are provided in the web portions 19a of the side rails 19 and are used for mounting threaded stock guide rail support studs 24 and threaded sprocket and chain guide support studs 25 which are secured by nuts 26. The stock guide rail assembly generally designated 27 which is provided at each side of the machine to maintain the horizontal position of the plastic sheet 18 comprises guide rails having associated cooling tubes 29 and are clamped in place between the guide rails 28 and plates 30 by nuts 31 on the studs 24. The function of the cooling tubes 29 is to maintain the temperature of the guide rails 28 below a predetermined temperature and is more completely described in the applicant's assignee's copending United States patent application Ser. No. 319,192.

Figure 2:
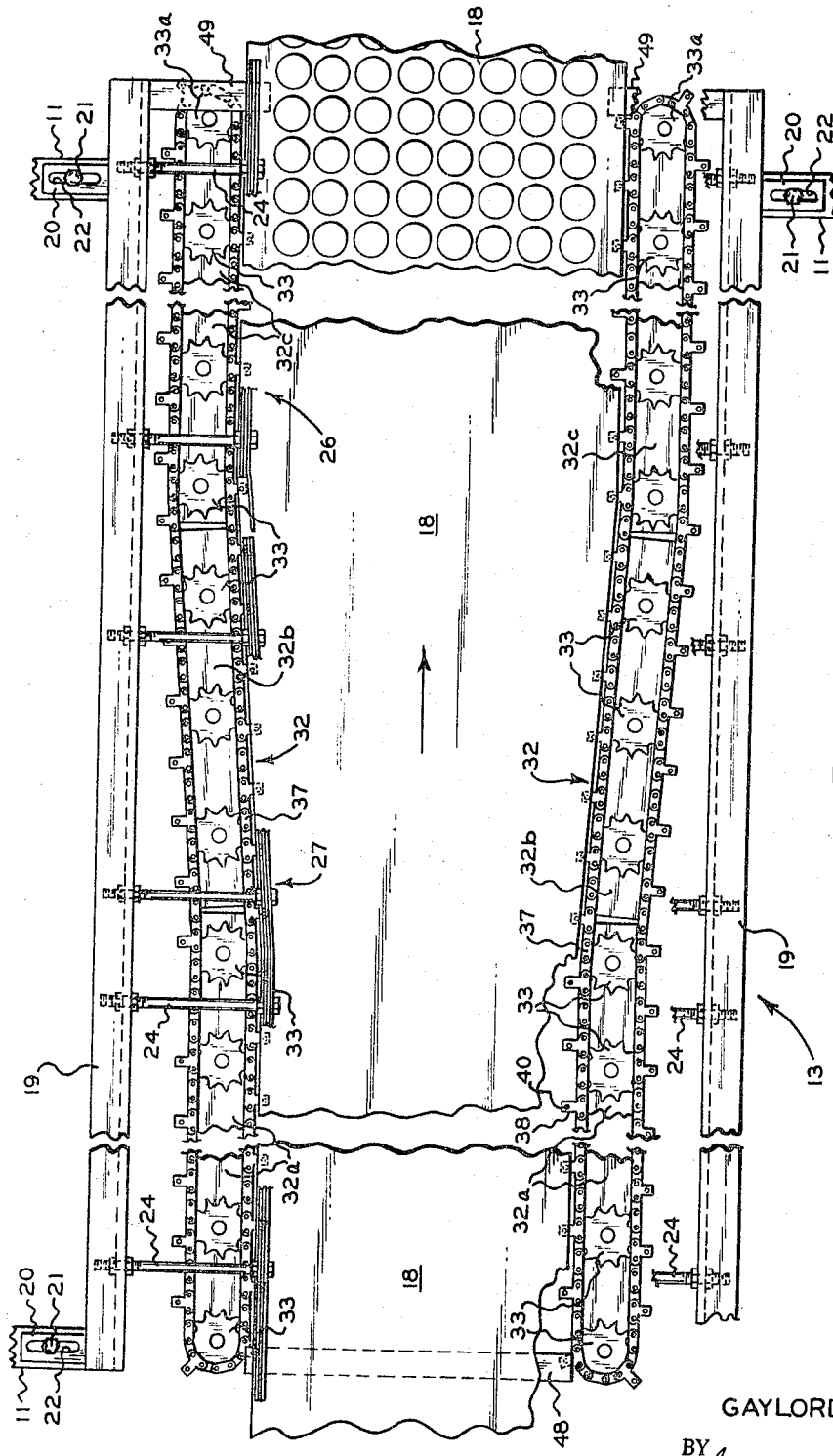
FIGURE 2 is an enlarged top plan view of the sheet conveying means only.

As shown in FIGURE 3, a sprocket and chain guide support means 32 is adjustably secured to each rail 19 by the studs 25 and adjusting nuts 26. Each support means 32 includes a longitudinal rear portion 32a, an intermediate, outwardly extending, divergent portion 32b, and a longitudinal front portion 32c as shown in FIGURE 2, and each portion or length may be adjusted independently, if desired. If the portions 32a, 32b, and 32c are separately supported for relative adjusting movement, separate guide rails 28, cooling tubes 29, and plates 30 are also provided for each portion. A series of idler sprockets 33 are rotatably mounted on the support means 32 by means of threaded bolt shafts 34 and nuts 34a. Also bolted to the supports 32 are angle members 35 which support chain guide shoes 36 for the endless roller chains 37 which are trained around the line of sprockets 33 at each side of the machine. It will be noted that laterally extending lugs 38 are provided on certain spaced apart chain links 39 and that these lugs 38 mount upright pins 40 which are adapted to engage and penetrate the edges of the plastic sheet 18.

Figure 6:
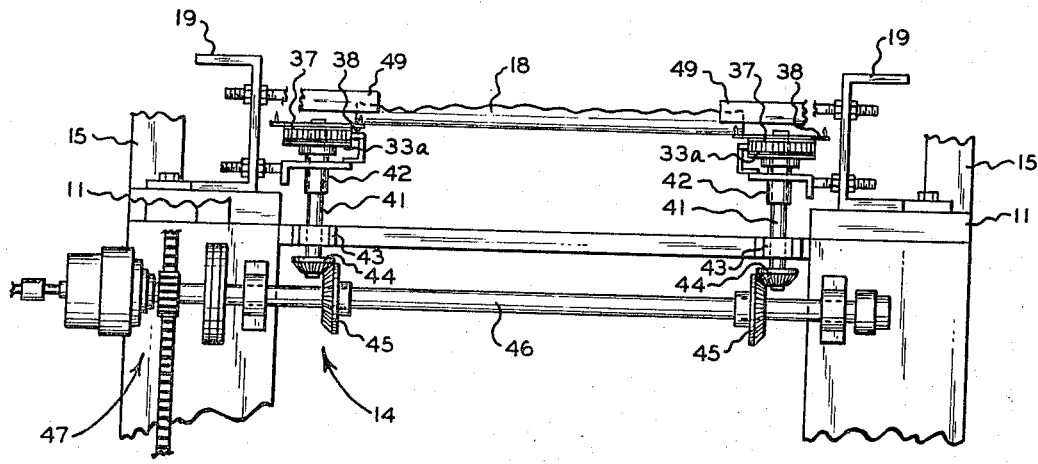
FIGURE 6 is a fragmentary, rear end elevational view illustrating the sheet conveyor drive means.

As shown in FIGURE 6, the front end sprockets 33a are mounted on vertical shafts 41 which are journaled by bearings 42 and 43. A bevel gear 44 is secured to the lower end of each shaft 41 and is engaged with a mating bevel gear 45 which in turn is secured to a horizontal drive shaft 46. The drive shaft 46 is intermittently operated by the rack and pinion mechanism 47 to advance the sheet 18 incrementally in the manner described in the aforementioned copending patent application Ser. No. 276,000. Successive portions of the sheet are advanced to the forming zone and are held in stationary position for a length of time sufficient to permit the die platens 16 and 17 to move together and form the sheet, and thence to separate once again.

A guide shelf 48 (see FIGURES 2 and 5) supported by the frame 11 is provided to assist the sheet 18 into the machine and to prevent the sheet 18 from engaging the pins 40 until the pins 40 have completed their turn around the rear end idler sprockets 33. The rails 28 are provided with downwardly inclined surfaces 28a at their rear ends to force the sheet 18 downwardly so that it is penetrated by the pins 40, and are provided with similar upwardly inclined surfaces at their front ends which permit the sheet 18 to raise off the pins 40. Also, at the front end of the machine, stripper guides 49 (see FIGURES 2 and 6) are provided on the rails 19 to positively raise the sheet 18 from the pins 40 as the sheet 18 leaves the machine.

In operation the thermoplastic sheet 18 is fed into the machine between the guide shelf 48 and the downwardly inclined ends 28a of guides 28. The stock gradually becomes impaled on pins 40 at its follows the lower surfaces of guides 28. This insures that the stock will be advanced without any possibility of slipping. The sheet is advanced incrementally through the heating and molding areas to the front end of the machine, where the underside of the sheet is engaged by stripper guides 49 to remove the sheets 18 from pins 40.

As shown in FIGURE 2, the support rail portions 32a which mount the front sprockets 33 are adjusted to the width of the incoming sheet 18 and are parallel to each other. The support portions 32b diverge as the sheet moves through the heating area 12 just enough to take up the thermal elongation which occurs when the sheet 18 is heated and prevents the midportion of the sheet 18 from sagging. The divergence of the portions 32b is not extreme enough to itself stretch the plastic sheet 18 widthwise, however. Front sections of the support portions 32a and substantially the entire portions 32b extend between the upper and lower heating lamps 12a. The support portions 32c which extend from the rear end of the molding station F through to the front end of the machine are parallel but are spaced farther apart than the portions 32a to accommodate the increased width of the sheet.

To set up the machine, it is necessary to know the amount of growth or widthwise expansion of the sheet 18 which will take place as a direct result of heating the plastic sheet 18 to a forming temperature. This can be calculated or determined by experimentation. After this determination is made, the support portions 32b are then adjusted to diverge by an amount which is exactly equal to the growth which will be obtained. The conveyor chains 37, when carefully adjusted, will prevent thermal elongation of the sheet 18 from causing sagging but will not stretch the sheet, thus enabling a far better control over the quality of the parts produced than could formerly be attained. The bearings 43 and bevel gears 45 may be adjusted horizontally so that the shafts 41 can be maintained in a vertical position when the support portions 32c are adjusted.

It is to be understood that the drawings and descriptive matter are to be interpreted as merely illustrative of the principles of the invention, rather than as limiting the same in any way, since it is contemplated that various changes may be made in various elements to achieve like results without departing from the spirit of the invention or the scope of the appended claims.

I claim:
1. A method of thermoforming thermoplastic plastic sheet comprising: applying gripping means to a longitudinally extending sheet at its side edges, and moving the gripping means longitudinally while applying heat to the surface area of the sheet to render it deformable; the gripping means in at least a portion of the longitudinal travel being moved laterally outwardly at a rate which takes up the thermal widthwise expansion of the heated sheet but imparts substantially no widthwise stretching pull to the sheet and relatively moving differential pressure forming die means and the heated sheet to form articles therein.

2. A method of thermoforming thermoplastic plastic sheet comprising: applying a gripping means to a longitudinally extending linear polyethylene sheet at each of its side edges, and moving the gripping means first longitudinally in a parallel direction while applying heat to the surface area of the sheet; thence, while continuing to apply heat to bring the sheet to a forming temperature, moving the gripping means longitudinally and laterally outwardly at a rate which takes up the thermal widthwise expansion of the heated sheet but imparts substantially no widthwise stretching pull to the sheet, thence moving the gripping means again longitudinally in a parallel direction to dispose the sheet in a forming zone; and bringing differential pressure forming die means to said heated sheet to form articles therein.

References Cited by the Examiner

UNITED STATES PATENTS

| | | | |
|---|---|---|---|
| 2,473,404 | 6/1949 | Young | 26—60 X |
| 3,171,873 | 3/1965 | Fikentscher et al. | 34—158 X |
| 3,257,489 | 6/1966 | Heffelfinger | 264—235 X |

FREDERICK L. MATTESON, Jr., *Primary Examiner.*

JOHN J. CAMBY, *Examiner.*